June 23, 1959  C. W. WOOD ET AL  2,891,730
THERMOSTATIC VALVE WITH SAFETY LOCK
Filed July 27, 1954
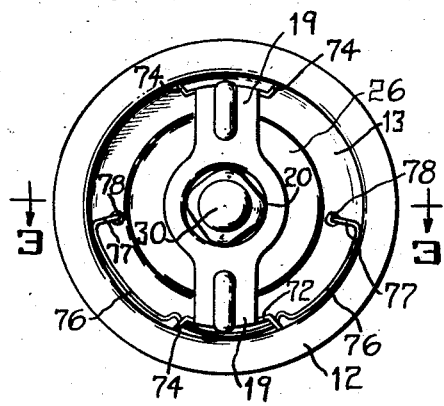
Fig. 1
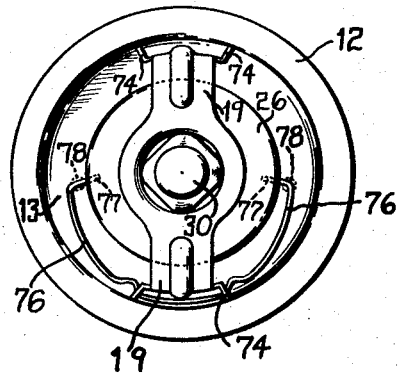
Fig. 2
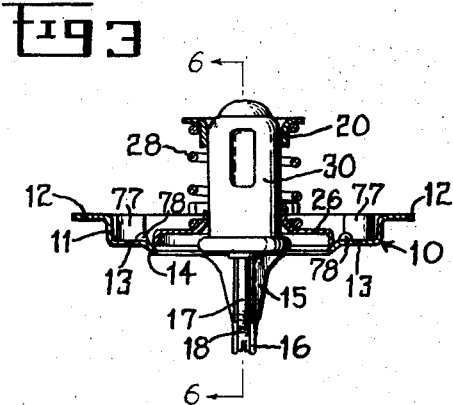
Fig. 3
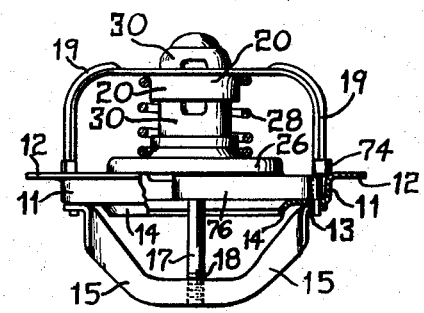
Fig. 4
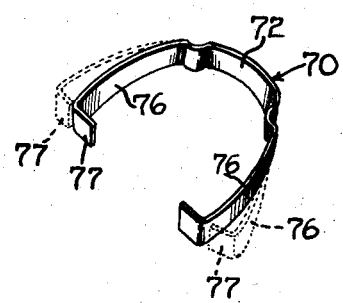
Fig. 5
Fig. 6
INVENTORS.
CHARLES W. WOOD
CARLTON W. BONDURANT
BY
Dybvig and Jacox
THEIR ATTORNEYS—

United States Patent Office 2,891,730
Patented June 23, 1959

2,891,730

THERMOSTATIC VALVE WITH SAFETY LOCK

Charles W. Wood, Lebanon, and Carlton W. Bondurant, Dayton, Ohio, assignors to Standard-Thomson Corporation, Dayton, Ohio, a corporation of Delaware Application July 27, 1954, Serial No. 445,964

6 Claims. (Cl. 236—34)

This invention relates to a thermal responsive fluid control valve. The invention relates more particularly to a thermostatic fluid control valve for the cooling system of an internal combustion engine; however, the invention is not so limited in that it may be applied to other types of fluid systems.

When an internal combustion engine is operating satisfactorily, a thermostatic fluid control device positioned within the cooling system regulates the temperature of the engine by governing the flow of fluid within the cooling system and thus controlling the temperature of the fluid within the cooling system. The cooling system of the engine is so designed that under normal operating conditions the cooling system can retain the temperature of the engine at a predetermined value.

When defective operation occurs in an internal combustion engine, the result oftentimes is that the engine begins to heat excessively. When this excessive heating occurs, the fluid in the cooling system is heated excessively and a thermostatic control valve, which is positioned in the cooling system of the internal combustion engine, is caused to open to the greatest extent to permit the greatest amount of circulation of cooling fluid within the cooling system.

Frequently when this condition occurs, the cooling system is unable to properly cool the engine even though the greatest amount of fluid circulates within the cooling system. Therefore, the fluid of the cooling system also heats excessively and the thermostatic fluid control valve is heated to a very high temperature. Frequently, the very high temperature to which the thermostatic control valve is heated causes considerable damage to the thermostatic valve and the thermostatic valve does not operate properly. The thermostatic valve may be so injured or damaged that it is forced to a closed position even though the temperature of the cooling fluid is very high. When the closing action of the damaged control valve occurs, the circulation of cooling fluid, which is assisting to some extent in cooling the engine, is completely shut off so that the temperature of the engine further increases causing greater damage to the internal combustion engine.

Therefore, it may be understood that a very desirable thermostatic fluid control valve is one which is provided with "fail safe" means or, in other words, with means by which it will remain fully open after it is so actuated by extremely high temperatures within the cooling system of the engine. A desirable "fail safe" fluid control valve for engines is also one which remains open when damage occurs to the valve. When the greatest amount of circulation within the cooling system is permitted, if the engine is heating excessively, greatest protection to the engine is therefore provided.

In some types of thermal responsive devices it is preferable to employ a lock mechanism which is operated directly by a temperature responsive means regardless of the position of the movable valve member. In some types of thermal responsive devices the open position of the movable valve member does not change appreciably from a high temperature to an excessively high temperature. In other words, in some types of thermal responsive devices the ratio of the movement of the movable valve member per degree of temperature decreases at higher temperatures. Therefore, a lock mechanism which retains a movable valve member in an open position if the movable valve member reaches a given position is not satisfactory in some types of thermal responsive devices.

Hence, an object of this invention is to provide a thermal responsive fluid control valve which has means by which the control valve is held in an open position after the control valve has been subjected to abnormal temperatures.

Another object of this invention is to provide a thermal responsive fluid control valve which is retained in an open position after being heated excessively and regardless of whether the movable valve member has been moved to the maximum open position.

Another object of this invention is to provide a thermal responsive fluid control valve, the lock-open mechanism of which must be reset in order to close the movable valve member.

Other objects and advantages reside in the construction of parts, the combination thereof and the mode of operation, as will become more apparent from the following description.

In the drawings,

Figure 1 is a top plan view showing the valve locking device of this invention.

Figure 2 is a top plan view similar to that of Figure 1 and showing the position of the fingers of the lock member after the valve has been subjected to abnormal temperatures.

Figure 3 is a section view taken substantially on the line 3—3 of Figure 1.

Figure 4 is a side elevational view with parts broken away showing the valve locking member of this invention after it has been subjected to abnormal temperatures.

Figure 5 is a perspective view disclosing the lock member of this invention.

Figure 6 is a section view taken substantially on line 6—6 of Figure 3 but with the movable valve member in an open position.

Referring to the drawing in detail, the valve of this invention comprises an annular body member 10 provided with an annular flange portion 11 and having an outwardly extending projection 12 which is normal to the flange 11. An inwardly extending rib 13 of the flange 11 terminates in an annular valve seat 14 having a fluid port therethrough. Attached to the inwardly extending rib 13 and positioned on one side surface thereof is an arcuately formed bridge member 15 which is attached at each end thereof to the extending rib 13. The arcuately formed bridge member 15 comprises an elongate U-shaped member having wing portions 16. Threadedly attached to the bridge member 15 substantially at the center thereof is a rod member 17 having a threaded portion 18.

Extending from the other surface of the rib 13 substantially parallel to the flange 11 are a pair of support arms 19. Each support arm 19 is attached at one end thereof to the rib 13. The other end of each arm 19 supports an annular guide ring 20 which is rigidly attached to the end of the arm 19. A movable valve member 26 is urged toward engagement with the valve seat 14 by means of a helical spring 28. One end of the helical spring 28 encircles the guide ring 20 and abuts the arm 19. The other end of the helical spring 28 engages the movable valve member 26. Attached to the movable valve member 26 and substantially concentric therewith is a casing or container member 30.

The casing 30 contains an expansible-contractible material 32 of any suitable type having a high coefficient of expansion over a given temperature range. The container 30 is completely closed except for a comparatively small aperture in one end thereof through which the rod member 17 slidably extends. The rod 17 also extends into an elastic body or spool 34 within the container 30 as shown in Figure 6. The end of the rod 17 within the elastic body 34 has a tapered portion 36.

In normal operation of the thermal responsive device as shown herein, expansion of an expansible-contractible material within the container 30 causes pressure to be exerted upon the portion of the rod 17 extending within the container 30. The expansible-contractible material expands substantially when heated above a given temperature. Expansion of the expansible-contractible material thus squeezes upon the elastic body 34 and causes relative movement of the rod 17 with respect to the container 30. However, due to the fact that the rod member 17 is rigidly attached to the bridge member 15, the expansion of the expansible material 32 within the container 30 results in movement of the container 30 in a direction substantially parallel to the arms 19.

The movable valve member 26 which is attached to the casing or container member 30 is caused to move with the movement of the casing member 30. Thus, the movable valve member 26 is moved away from the valve seat 14, as shown in Figure 4, upon expansion of the expansible-contractible material 32 within the container.

The movable valve member 26 may be attached to a container member such as the container member 30, as shown, or the valve member 26 may be attached to any other type of thermal responsive actuator means.

The valve of this invention is adapted to be positioned in a cooling system of an internal combustion engine. The valve regulates the temperature of the cooling fluid and thus regulates the temperature of the engine. However, the valve of this invention may be used in any thermal transfer system in which it is desired to control the amount of heat transfer by regulation of the amount of fluid passing through the system. During normal operation of this movable valve member 26, which is actuated by the expansible-contractible material 32 within the container member 30, the movable valve member 26 is properly positioned with respect to the valve seat member 14 so that proper circulation of the fluid in the thermal transfer system is maintained. Hence, the temperature of the fluid within a thermal transfer system is properly regulated. When the thermal responsive device is subjected to temperatures at or above the opening temperature of the thermal responsive device, the movable valve member 26 is positioned in spaced relation to the valve seat member 14. This automatically adjusted distance between the valve seat member 14 and the movable valve member 26 is determined by the amount of flow necessary in the thermal transfer system to maintain a substantially constant temperature in the thermal transfer system.

If the operation of an internal combustion engine becomes defective the result may be that the engine heats excessively. Such excessive heating may result that the thermal responsive device which controls the flow of fluid in the cooling system of the engine may become damaged and may not operate properly. If a thermal responsive device, so located within a cooling system, should be so damaged that it closes even though the temperature of the engine is very excessive, the engine may be severely injured. This is due to the fact that the flow of coolant through the engine is stopped in that the valve adapted to control the temperature is caused to close. Therefore, it is very desirable that a thermal responsive device has means provided therein which automatically locks the movable valve member thereof in an open position when the valve member is subjected to excessive temperatures. Hence, the movable valve member will remain in an open position and the thermal responsive device "fails safe."

The lockout means of this invention may be used with other types of thermal responsive devices other than that shown in the drawing. For example, the lockout means of this invention may be used with a thermal responsive device which is actuated by a bellows member, rather than by a thermal responsive device provided with a rigid container member having disposed therein an actuator rod which is movable by means of a thermal expansible-contractible material disposed within the rigid container. In the device shown herein, the lockout means includes a horseshoe shaped or U-shaped spring member clearly shown in Figure 5. A U-shaped lock member 70 is provided with a base portion 72 which is adapted to be attached to one of the support arms 19 adjacent the flange 11. Each of the arm members 19 is provided with a pair of lugs 74 which aid in retaining the base 72 of the lock member 70 in proper position. The lock member 70 may be mounted adjacent either of the arms 19, between the arm member 19 and the flange 11. Therefore, as clearly seen in the drawing, the lock member 70 is nested within the body member 10 adjacent the flange 11 and the rib 13. The lock member 70 is provided with a pair of fingers 76 which are resiliently movable with respect to the base 72. At the end of each of the fingers 76 is a lip 77 substantially normal thereto.

After the base member 72 of the lock member 70 is secured against the flange member 11 and retained in such position by means of the lugs 74, the finger members 76 of the lock member 70 are forced or biased outwardly and positioned adjacent the flange 11 as shown in Figures 1 and 3. After the fingers 76 are biased into position, a small amount of solder 78 or other suitable fusible material is secured to the rib member 13 and to each lip 77 of the spring 70. Each portion of solder 78 secures one of the fingers 76 to the rib 13 as shown in Figure 3. Thus, the fingers 76 are retained in a position adjacent the flange 11 of the body 10 and thus the fingers 76 are resiliently biased to a position in spaced relation from the path of movement of the movable valve member 26.

If the valve device 10 is subjected to abnormal temperatures, the movable valve member 26 will be caused to move to an open position by means of the expansible material within the container 30. Such abnormal temperatures may exist that the valve device is heated to such an extent that it is damaged. If the valve device becomes damaged, the spring member 28 may have sufficient resilient pressure to force the movable valve member 26 to move toward closed position, even though the valve member should remain open to permit maximum circulation of cooling fluid for protection of the engine.

When the valve member is subjected to a predetermined abnormal temperature, the solder 78 melts, permitting the resilient fingers 76 to spring inwardly, as shown in Figures 2 and 4. The lips 77 of the lock member 70 then are positioned in the path of movement of the movable valve member 26 between the movable valve member 26 and the valve seat member 14, as shown in Figures 2 and 4. Therefore, the movable valve member 26 is prevented from moving into engagement with the valve seat member 14, and the valve member 26 remains in an open position. Thus, fluid is permitted to flow through the port formed by the valve seat member 14, and even though the valve device is severely damaged by the excessive temperatures to which it is subjected, the fluid in the fluid system is permitted to freely flow and to offer a cooling effect upon the engine.

After such excessive temperatures occur within a fluid system of an engine that a thermostatic valve within the fluid system locks open as shown in Figures 2 and 4, it is usually necessary to perform repair work upon the engine. The operator of the engine should determine the condition of the thermostatic valve and should reset the movable valve member to normal operating position if the valve is not damaged. This resetting operation requires that the finger 76 of the lock member 70 be again forced outwardly to engage the flange 11, and the lip 77 must again be soldered to the rib 13 to retain the finger 76 in the biased position against the flange 11. The operator or mechanic can perform the inspection and resetting of the valve by opening the cooling system to make the thermostatic valve accessible.

Under certain conditions, the operator of an engine may not know of the defective engine operation and excessive heating thereof which results in lock-open operation of the locking member of the valve. In such event the movable valve member 26 is not reset to normal operating position. The engine may later operate satisfactorily except that it does not operate at the proper temperature. This is due to the fact that the movable valve member 26 is locked open to permit uncontrolled circulation of cooling fluid. Low temperature operation of an engine will result if flow of the cooling fluid is uncontrolled. This low temperature of the engine operation should indicate to the operator that something has occurred in the engine performance to warrant inspection of the engine and the thermostatic valve.

The movable valve member 26 is retained in an open position as shown in Figures 2 and 4. Therefore, it may be understood that the thermal responsive fluid valve of this invention "fails safe" and offers protection to the engine even though the thermal responsive fluid valve may become damaged by defective conditions within the engine.

Frequently, the valve device is not reset after it has locked open by abnormal heating of the engine. It may be considered that the valve device has served its purpose when it has, in addition to regulating normal engine temperature, locked open permitting uncontrolled flow of fluid as an engine protective method when the engine temperature became excessive. Thus, the valve device may be replaced by another similar device. The replacing of one valve device with another valve device may be performed as a part of an operation which includes repair of the engine which has heated excessively.

It will be understood that the finger members 76 may be retained in biased position by thermal responsive means other than a fusible material such as solder; for example, a suitable thermal responsive device may be employed to retain the finger members 76 in their biased positions, releasing the finger members upon subjection of the valve device to a predetermined abnormal temperature.

It is to be understood that actuation of the movable valve member 26 is not limited to operation by the expansible-contractible material within the container 30 which cooperates with the rod 17. The operation of the movable valve member 26 may be actuated by a bellows member or by any other suitable control device. The lock member 70 need not be shaped as a U-shaped member having two arms but may be a single arm member or be of any other suitable shape and design.

Although the preferred embodiment of the device has been described, it will be understood that within the purview of this invention various changes may be made in the form, details, proportion and arrangement of parts, the combination thereof and mode of operation, which generally stated consists in a device capable of carrying out the objects set forth, as disclosed and defined in the appended claims.

Having thus described our invention, we claim:

1. In a thermal responsive device, support structure forming a valve seat and having a flow passage therethrough, a reciprocally movable valve member operable to engage the valve seat, an arm attached to the support structure for guiding movement of the valve member, a lock member attached to the support structure and provided with a finger resiliently movable to a position adjacent the flow passage, a thermal responsive element secured to the support structure and to the finger of the lock member, the thermal responsive element permitting movement of the finger to a position within the flow passage upon subjection of the device to an abnormal temperature.

2. A thermostatic valve assembly comprising a body member having a flow passage, a valve seat, a movable valve member operably engageable with the valve seat, a resiliently operable finger member attached to the body member and movable into the flow passage and engageable by the movable valve member for restricting movement of the movable valve member, and thermal responsive means normally retaining the finger member in resiliently biased position outside the flow passage, the thermal responsive means releasing the finger member for said movement into the flow passage when the thermal responsive means is subjected to an abnormal temperature.

3. In a fluid control valve comprising an annular valve seat member providing a fluid flow passage therethrough, a flange attached to said valve seat member, a pair of support members attached to the valve seat member and extending in the direction of fluid flow through the flow passage formed by the valve seat member, a second pair of support members attached to the valve seat member and extending therefrom in a direction opposite the direction of fluid flow, a movable valve member engagable with the valve seat member and movable against the direction of fluid flow during opening movement of the movable valve member, a casing member attached to the movable valve member and provided with a rigid apertured enclosing wall adjacent thereto and parallel therewith, a guide member attached to the second pair of support members and substantially concentric with the movable valve member, the guide member encircling the outer periphery of the casing member adjacent thereto, a body of elastic material within the casing member contacting opposite end walls of the casing member, an expansive material within the casing member engaging the body of elastic material, a rod member attached to the first said support members, the rod member slidably extending into the casing member through the apertured enclosing wall of the casing member, the rod member having a tapered end within the body of elastic material, a helical spring encircling the casing member and the guide member, one end of the helical spring engaging the movable valve member and the other end of the helical spring engaging the pair of support members to which the guide member is attached, and a U-shaped spring member attached to the valve seat member and provided with a pair of resilient arms, a fusible material attached to each of the arm members retaining the arm members in biased position adjacent the flange of the valve seat member, the arms being released by the fusible material upon subjection to abnormal temperature for movement of the arms into the path of movement of the movable valve member.

4. In a thermal responsive valve device comprising a support structure provided with a valve seat forming a flow passage therethrough, a movable valve member engageable with the valve seat to close the flow passage, thermal responsive means attached to the movable valve member for operation thereof in response to variations in temperature, and resilient means attached to the support structure, the resilient means being normally retained outside the flow passage, the resilient means being operably movable into the flow passage and into the path of movement of the movable valve member in response to a predetermined abnormal temperature value.

5. In a thermal responsive valve comprising an annular body member provided with a valve seat forming a flow passage therethrough, a movable valve member operable to engage the valve seat, a thermostatic actuator attached to the movable valve member, a lock member including a base and a pair of arcuate resilient fingers attached thereto, the base of the lock member being attached to the body member adjacent the flow passage, the arcuate fingers being resiliently movable to partially surround the flow passage, the arcuate fingers having a natural radius of curvature less than the radius of curvature of the flow passage, the finger thus having a natural position extending into the flow passage, thermal responsive means attached to the body member and attachable to the resilient fingers for biasing the resilient fingers to positions outside the flow passage, the thermal responsive means releasing the resilient fingers for movement thereof into the flow passage and into the path of movement of the movable valve member upon subjection of the thermal responsive means to a predetermined abnormal temperature, the resilient fingers thus limiting movement of the movable valve member.

6. In a valve device, an annular valve seat member forming a flow passage therethrough, a movable valve member engageable with the valve seat member, a lock member attached to the valve seat member, the lock member comprising a leaf spring provided with an arcuate portion, the arcuate portion being bendable to a position in which the arcuate portion is concentric with the valve seat and in spaced relation to the flow passage, the normal position of the arcuate portion being such that the leaf spring extends into the flow passage and into the path of movement of the movable valve member, the normal position of the arcuate portion of the leaf spring limiting movement of the movable valve member, and thermal responsive means for retaining the arcuate portion in position adjacent the flow passage and concentric therewith, the thermal responsive means releasing the arcuate portion upon subjection of said means to an abnormal temperature.

References Cited in the file of this patent

UNITED STATES PATENTS

| | | |
|---|---|---|
| 1,952,516 | Sperry | Mar. 27, 1934 |
| 2,027,458 | Te Pas | Jan. 14, 1936 |
| 2,131,094 | Clark | Sept 27, 1938 |
| 2,356,958 | Wangenheim | Aug. 29, 1944 |

FOREIGN PATENTS

| | | |
|---|---|---|
| 573,672 | Germany | Apr. 4, 1933 |